United States Patent
Moharil

(10) Patent No.: US 12,524,573 B2
(45) Date of Patent: Jan. 13, 2026

(54) DATABASE TABLE DATA OBFUSCATION TECHNIQUES

(71) Applicant: Insight Direct USA, Inc., Chandler, AZ (US)

(72) Inventor: Abhijit Moharil, Tempe, AZ (US)

(73) Assignee: Insight Direct USA, Inc., Chandler, AZ (US)

( * ) Notice: Subject to any disclaimer, the term of this patent is extended or adjusted under 35 U.S.C. 154(b) by 260 days.

(21) Appl. No.: 18/203,855

(22) Filed: May 31, 2023

(65) Prior Publication Data

US 2024/0338483 A1 Oct. 10, 2024

Related U.S. Application Data

(60) Provisional application No. 63/457,660, filed on Apr. 6, 2023.

(51) Int. Cl.
*G06F 21/62* (2013.01)
*G06F 16/27* (2019.01)

(52) U.S. Cl.
CPC .......... *G06F 21/6254* (2013.01); *G06F 16/27* (2019.01)

(58) Field of Classification Search
CPC ............................. G06F 21/6254; G06F 16/27
See application file for complete search history.

(56) References Cited

U.S. PATENT DOCUMENTS

| | | | |
|---|---|---|---|
| 9,239,852 B1 | 1/2016 | Lutz et al. | |
| 9,881,164 B1 | 1/2018 | Mckay et al. | |
| 10,089,489 B2 | 10/2018 | Goldfarb et al. | |
| 10,713,384 B2 | 7/2020 | Veeramachaneni et al. | |
| 10,855,634 B2 | 12/2020 | Papa et al. | |
| 11,461,499 B2 | 10/2022 | Jun et al. | |
| 2006/0167920 A1 | 7/2006 | Hankinson | |
| 2010/0042583 A1* | 2/2010 | Gervais | G06Q 40/08 707/E17.014 |
| 2013/0054650 A1* | 2/2013 | O'Byrne | G06F 21/6227 707/E17.005 |
| 2013/0282679 A1* | 10/2013 | Khin | G06F 16/258 707/698 |
| 2014/0137262 A1* | 5/2014 | Stofberg | G06F 21/6218 726/26 |
| 2015/0331884 A1* | 11/2015 | Dillon | G06F 16/1727 707/607 |

(Continued)

*Primary Examiner* — Robert B Leung
(74) *Attorney, Agent, or Firm* — Kinney & Lange, P.A.

(57) ABSTRACT

An obfuscation system includes a first database for storing raw data, a quality assurance testing database for storing modified data, one or more processors, and computer-readable memory. The computer-readable memory is encoded with instructions that, when executed by the one or more processors, cause the obfuscation system to: access raw data from the production database, copy the raw data from the production database to the quality assurance testing database, identify sensitive data within the raw data for obfuscation in the quality assurance testing database, obfuscate the sensitive data that has been identified by replacing the sensitive data in each field with a concatenation of a unique descriptor that describes the sensitive data in the field and a primary key, and store the modified data in the quality assurance testing database for access via a user interface.

18 Claims, 4 Drawing Sheets

(56) References Cited

U.S. PATENT DOCUMENTS

| | | | |
|---|---|---|---|
| 2016/0078023 A1* | 3/2016 | Schalk | G06F 16/2386 |
| | | | 707/825 |
| 2017/0098093 A1* | 4/2017 | Koo | G06F 21/6209 |
| 2021/0192066 A1 | 6/2021 | Naqvi et al. | |
| 2021/0406400 A1 | 12/2021 | Tawakol et al. | |

* cited by examiner

| F1 | F2 | F3 | F4 |
|---|---|---|---|
| JOHN | DOE | 2/3/65 | 7 YEARS |
| JANE | DOE | 6/7/89 | 10 YEARS |
| F5 | F6 | F7 | F8 |

ACCOUNT 12345

| FR1 | FR2 | FR3 | FR4 |
|---|---|---|---|
| NAME1_12345 | NAME2_12345 | DOB1_12345 | 7 YEARS |
| NAME3_12345 | NAME4_12345 | DOB2_12345 | 10 YEARS |
| FR5 | FR6 | FR7 | FR8 |

Result

DATABASE TABLE DATA OBFUSCATION TECHNIQUES

CROSS-REFERENCE TO RELATED APPLICATION

The present application claims priority to U.S. provisional patent application Ser. No. 63/457,660 by A. Moharil, filed Apr. 6, 2023 and entitled "DATABASE TABLE DATA OBFUSCATION TECHNIQUES."

BACKGROUND

The present disclosure relates to data management, and in particular, to data obfuscation management.

When changes need to be made to a production database, they are first tested in a testing database. Prior to implementing a change, such as an update, in the production database, the change undergoes quality assurance testing in a quality assurance testing database. Whether the change works, or yields the proper result, without breaking, or causing unwanted change, to other parts of the quality assurance testing database indicates whether the change passes quality assurance testing. The change can be implemented into the production database if it passes the quality assurance testing. In order to accurately test changes in the quality assurance testing database, the quality assurance testing database must comprise data similar to the data in the production database. The production database often contains sensitive data, such as personally identifiable data, which requires adequate security. Users of the testing database are often not allowed to view the sensitive data. As such, data in the testing database must be managed in a way that protects the sensitive data.

SUMMARY

An obfuscation system includes a first database for storing raw data, a quality assurance testing database for storing modified data, one or more processors, and computer-readable memory. The computer-readable memory is encoded with instructions that, when executed by the one or more processors, cause the obfuscation system to: access raw data from the production database, copy the raw data from the production database to the quality assurance testing database, identify sensitive data within the raw data for obfuscation in the quality assurance testing database, obfuscate the sensitive data that has been identified by replacing the sensitive data in each field with a concatenation of a unique descriptor that describes the sensitive data in the field and a primary key, and store the modified data in the quality assurance testing database for access via a user interface.

A method of obfuscating data for a quality assurance testing database includes accessing raw data from a production database, copying the raw data from the production database to a quality assurance testing database, identifying sensitive data within the raw data from the production database for obfuscation in the quality assurance testing database, obfuscating the sensitive data that has been identified by replacing the sensitive data in each field with a concatenation of a unique descriptor that describes the sensitive data in the field and a primary key, and storing modified data in the quality assurance testing database for access via a user interface, the modified data comprising the sensitive data that has been obfuscated.

BRIEF DESCRIPTION OF THE DRAWINGS

FIG. 3A is a diagram showing an example of a table of data that includes sensitive data from a production database.

FIG. 3B is a diagram showing an example of a table of data that includes the sensitive data that has been obfuscated and non-sensitive data that has not been obfuscated from the quality assurance testing database.

DETAILED DESCRIPTION

In general, the present disclosure describes an obfuscation system for a quality assurance testing database that copies data from a production database and replaces each field of the sensitive, or personally identifiable, data with a concatenation of a unique descriptor that describes the underlying sensitive data and a primary key designating the table from which the sensitive data originates, such that the stored data in the quality assurance testing database is a combination of reversibly obfuscated sensitive data and non-sensitive data that has not been obfuscated.

Figure 1:
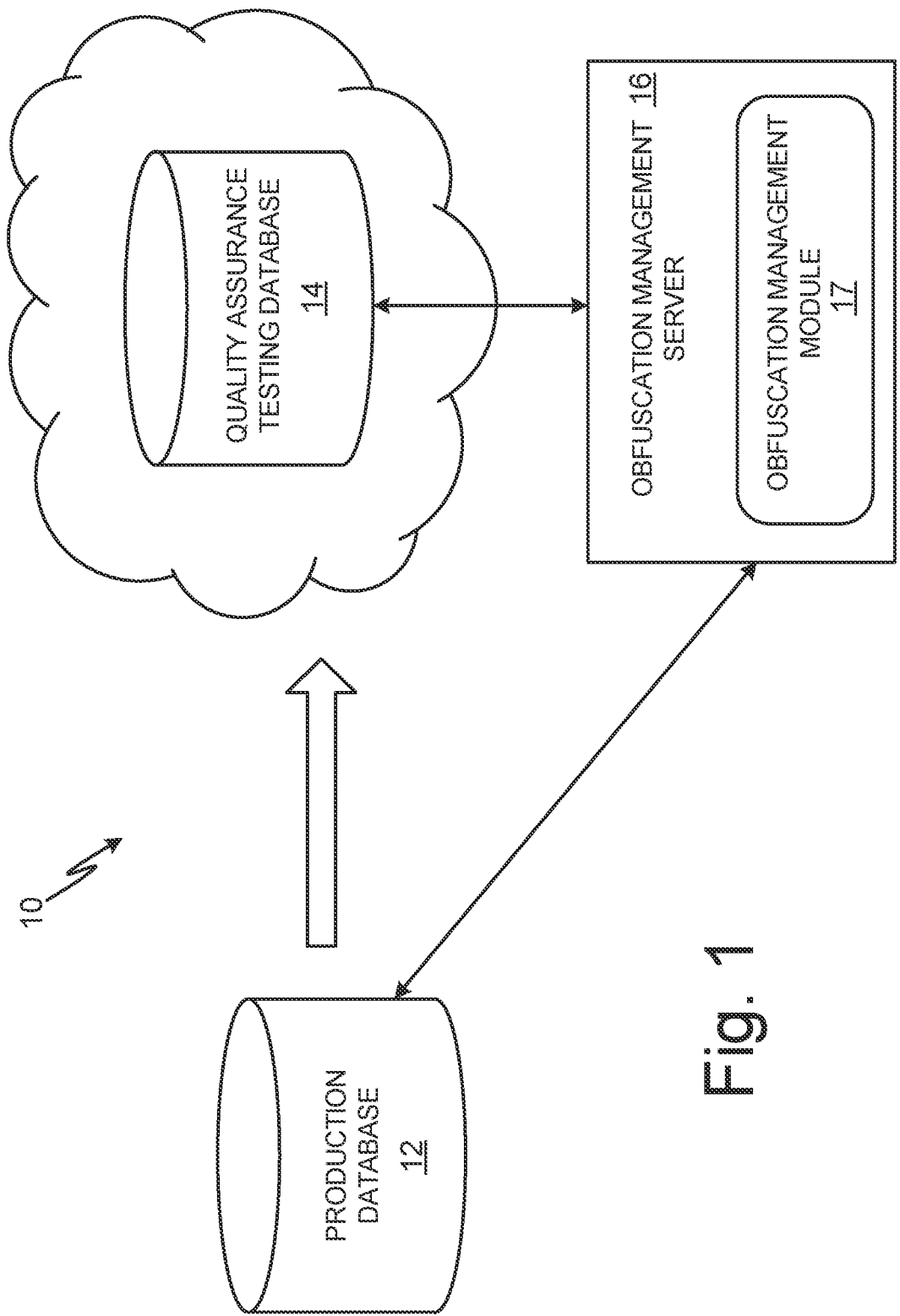
FIG. 1 is a schematic diagram showing an obfuscation system for obfuscating sensitive data in a quality assurance testing database.

FIG. 1 is a schematic diagram showing obfuscation system 10 for obfuscating sensitive data from production database 12 in quality assurance testing database 14. Obfuscation system 10 includes production database 12, quality assurance testing database 14, and obfuscation management server 16, which includes obfuscation management module 17.

Production database 12 contains raw data, including sensitive data and non-sensitive data. Sensitive data can include personally identifiable data, such as names, addresses, dates of birth, social security numbers, or any other data that is identified as needing to be obfuscated. Non-sensitive data is data that has not been identified as personally identifiable data. In production database 12, data is stored in tables made up of rows and columns. The intersection of a row and column within a table is a field. As such, each table contains fields of data. Each field includes a single record of data. Production database 12 is accessible by a limited number of users, and all of the users have permission to view the sensitive data in production database 12.

Quality assurance testing database 14 is a database similar to production database 12. For example, quality assurance testing database 14 has a similar configuration to production database 12. Quality assurance testing database 14 contains modified data. Quality assurance testing database 14 is in communication with obfuscation management server 16. In the embodiment shown in FIG. 1, quality assurance testing database 14 is in the cloud. In alternate embodiments, quality assurance testing database 14 may be stored in any suitable environment accessible by obfuscation management server 16, such as within obfuscation management server 16. In quality assurance testing database 14, data is stored in tables made up of rows and columns. The intersection of a row and column within a table is a field. As such, each table contains fields of data, similar to production database 12. Quality assurance testing database 14 is accessible by a large number of users via obfuscation management server 16. Quality assurance testing database 14 may be accessible by more users than production database 12. At least some of the users of quality assurance testing database 14 do not have permission to view the sensitive data from production database 12. In some examples, none of the users of quality assurance testing database 14 have permission to view the sensitive data from production database 12.

Obfuscation management server 16 is a server on which obfuscation management module 17 is running. Obfuscation management server 16 is in communication with production database 12 and quality assurance testing database 14. Obfuscation management module 17 interacts with production database 12 and quality assurance testing database 14 via obfuscation management server 16. Obfuscation management module 17 accesses and copies data from production database 12 to quality assurance testing database 14. Once the data from production database 12 is copied to obfuscation management server 16, obfuscation management module 17 runs a script that obfuscates, or scrambles, the sensitive data from production system 12 for use within quality assurance testing database 14. The non-sensitive data from production system 12 does not need to be obfuscated. The modified data, comprising both obfuscated sensitive data and non-sensitive data that has not been obfuscated, is subsequently stored in quality assurance testing database 14. In alternate embodiments, quality assurance testing database 14 may contain only obfuscated data, including sensitive data and, optionally, non-sensitive data.

Production database 12 may require a change, or build, such an update. A change that is going to be implemented in production database 12 needs to first be tested in quality assurance testing database 14. When the requisite change is developed, such as an SAP transport or SAP build, the change undergoes quality assurance testing in quality assurance testing database 14. The functionality of the change is tested in quality assurance testing database 14 to determine whether to promote the change to production database 12 for use in production database 12. For example, users of quality assurance testing database 14 can run quality assurance testing scripts or queries to see whether the change yields the proper result without causing unwanted change to quality assurance testing database 14. Changes are promoted to production database 12 if they pass quality assurance testing in quality assurance testing database 14. If changes do not pass quality assurance testing in quality assurance testing database 14, they are not implemented into production database 12. Because quality assurance testing database 14 is similar to production database 12, quality assurance testing database 14 serves as an accurate test environment as it simulates production database 12. As such, if the change to quality assurance testing database 14 is functional and accurate, or yields the proper results without disrupting other functionalities of quality assurance testing database 14, the change will be functional and accurate in production database 12. Thus, the change will accurately pass quality assurance testing.

Businesses are required to protect sensitive data, such as personally identifiable data. Access to production database 12 is limited. Production database 12 stores sensitive data, and the limited number of users of production database 12 are authorized to view the sensitive data. Because obfuscation system 10 obfuscates the sensitive data from production database 12 in quality assurance testing database 14, users of quality assurance testing database 14 are only able to see non-sensitive data and obfuscated sensitive data. Users of quality assurance testing database 14, who are not authorized to view personally identifiable data, cannot see non-obfuscated sensitive data. As a result, obfuscation system 10 protects the sensitive data, such as personally identifiable data, by preventing the sharing of sensitive data in a format that can be readily understood. At the same time, obfuscation management module 17 allows access to the data in quality assurance testing database 14. Obfuscation system 10 provides adequate data privacy while also providing data for use in quality assurance testing within quality assurance testing database 14.

Figure 2:
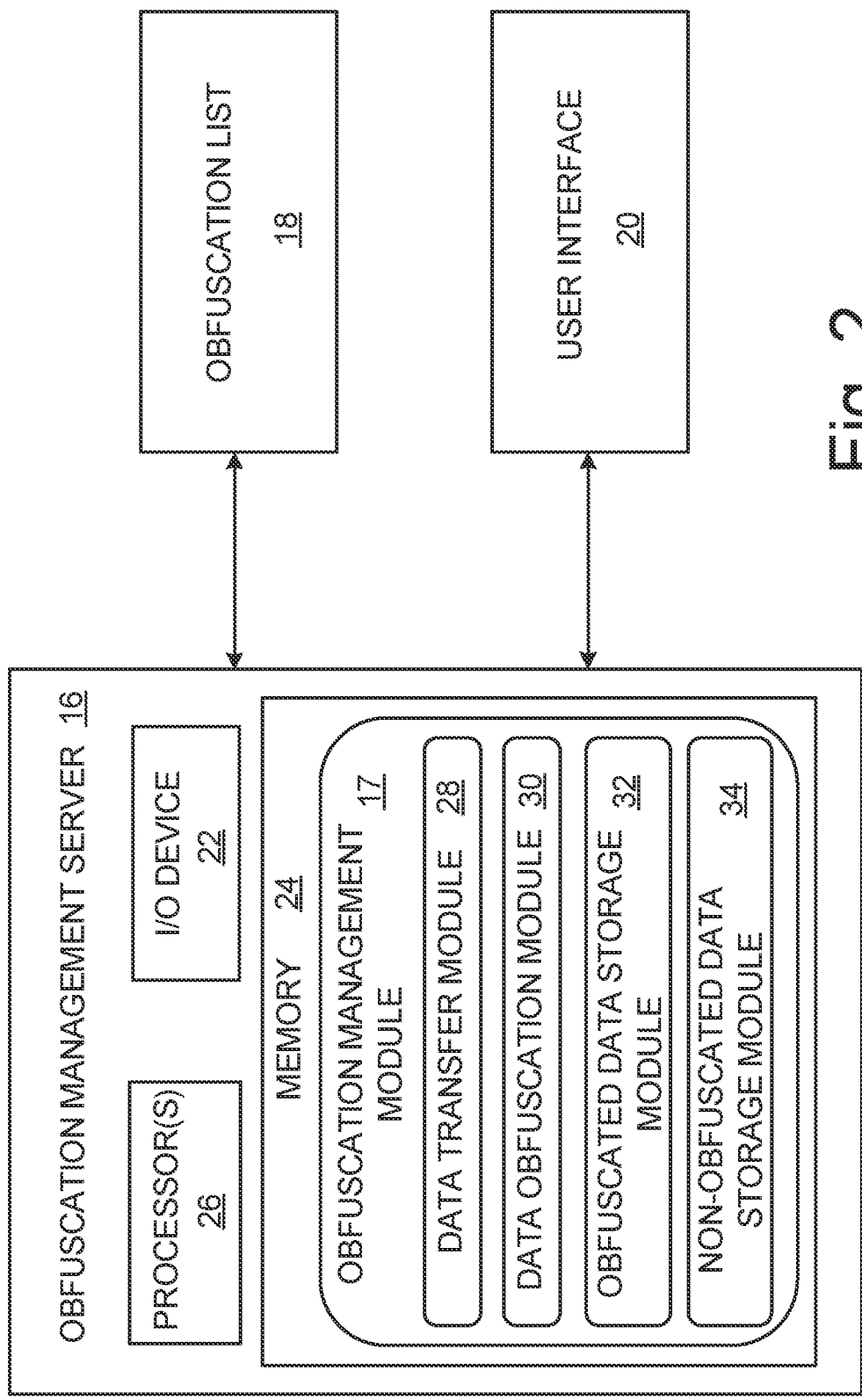
FIG. 2 is a schematic block diagram showing an obfuscation management server of the obfuscation system.

FIG. 2 is a schematic block diagram showing obfuscation management server 16 of obfuscation system 10. Obfuscation management server 16 interacts with obfuscation list 18 and user interface 20 to provide modified data to a user. Obfuscation management server 16 includes I/O device 22, memory 24, and processor(s) 26. Memory 24 includes obfuscation management module 17, which includes data transfer module 28, data obfuscation module 30, obfuscated data storage module 32, and non-obfuscated data storage module 34.

Quality assurance testing database 14, shown in FIG. 1, contains modified data from production database 12, including non-sensitive data that has not been obfuscated and sensitive data that has been obfuscated. Obfuscation management module 17 on obfuscation management server 16 obfuscates sensitive data in quality assurance testing database 14. Obfuscation management module 17 determines which data to obfuscate based on obfuscation list 18. Obfuscation list 18 contains instructions in code regarding which data from production database 12 to obfuscate, or scramble. For example, obfuscation list 18 can comprise instructions to scramble all data from production database 12 except data listed on obfuscation list 18. As another example, obfuscation list 18 can comprise instructions to only scramble data from production database 12 that is listed on obfuscation list 18. Obfuscation list 18 instructs obfuscation management module 17 to obfuscate sensitive data and to not obfuscate non-sensitive data.

The data modified by obfuscation management module 17 is accessible via user interface 20. User interface 20 allows users of quality assurance testing database 14 to interact with the modified data via obfuscation management server 16. User interface 20 can include control elements that enable user interaction with obfuscation management server 16 and quality assurance testing database 14. User interface 20 can include a display to present the modified data in quality assurance testing database 14 to a user. The display can be a liquid crystal display (LCD), a light-emitting diode (LED) display, an organic light-emitting diode (OLED) display, or other display device suitable for providing information to users. User interface 20 can include physical control elements that enable user input to interact with obfuscation management server 16 and/or quality assurance testing database 14.

I/O device 22 of obfuscation management server 16 can communicate wirelessly with various peripheral devices, such as user interface 20. I/O device 22 can include a plurality of input and/or output (I/O) connectors configured for wired connection (e.g., electrical and/or communicative connection) with one or more components of obfuscation management server 16 and quality assurance testing database 14. I/O device 22 can include any number of I/O connectors.

Memory 24 is configured to store information, including instructions and software code to be executed by processor(s) 26. Memory 24 can be described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Memory 24 can include volatile and non-volatile computer-readable memories. Examples of volatile memories can include random access memories (RAM), dynamic random-access memories (DRAM), static random-access memories (SRAM), and other forms of volatile memories. Examples of non-volatile memories can include, e.g., magnetic hard discs, optical discs, flash memories, or forms of electrically programmable memories (EPROM) or electrically erasable and programmable (EEPROM) memories.

Processor(s) 26 is capable of processing instructions stored in memory 24. Processor(s) 26 is configured to execute instructions, such as software code that implements modules of obfuscation management module 17, which produces obfuscated sensitive data and non-sensitive data that has not been obfuscated for use by users of quality assurance testing database 14. Examples of processor 26 can include any one or more of a microprocessor, a controller, a digital signal processor (DSP), an application specific integrated circuit (ASIC), a field-programmable gate array (FPGA), or other equivalent discrete or integrated logic circuitry.

Obfuscation management module 17 stored in memory 24 includes data transfer module 28, data obfuscation module 30, obfuscated data storage module 32, and non-obfuscated data storage module 34. Although described herein as being divided into four modules, the functionality of data transfer module 28, data obfuscation module 30, obfuscated data storage module 32, and non-obfuscated data storage module 34 could also be more or fewer modules, which could depend on how the code is written or organized.

Data transfer module 28 is a first module of obfuscation management module 17. Data transfer module 28 includes methods in code for accessing the raw data from production database 12 and copying the raw data from production database 12 to quality assurance database 14. More specifically, data transfer module 28 accesses and copies the raw data from production database 12 to obfuscation management server 16.

Data obfuscation module 30 is a second module of obfuscation management module 17. Data obfuscation module 30 includes methods in code for identifying sensitive data in the data from production database 12 and for obfuscating the sensitive data that has been identified. Obfuscation list 18 is used to identify the data to obfuscate on obfuscation management server 16. For example, data obfuscation module 30 can look for and find fields from obfuscation list 18 that contain sensitive data within the data copied from production database 12. During obfuscation, a script of data obfuscation module 30 creates tables containing modified data for quality assurance testing database 14. The sensitive data is obfuscated by replacing each field of the sensitive data with a concatenation of a unique string including a unique descriptor that describes the underlying field of the sensitive data and a primary key. The unique descriptor is associated with the field from production database 12 from which the sensitive data originates, as shown and further described below with respect to FIGS. 4A and 4B. The primary key is associated with the table from production database 12 from which the field of sensitive data originates, as shown and further described below with respect to FIGS. 4A and 4B.

Obfuscated data storage module 32 is a third module of obfuscation management module 17. Obfuscated data storage module 32 includes methods in code for storing obfuscated sensitive data in quality assurance testing database 14 for access via user interface 20. The obfuscated sensitive data is stored in the tables containing modified data.

Non-obfuscated data storage module 34 is a fourth module of obfuscation management module 17. Non-obfuscated data storage module 34 includes methods in code for storing non-sensitive data that has not been obfuscated in quality assurance testing database 14 for access via user interface 20. The non-obfuscated non-sensitive data is stored in the tables containing modified data along with the obfuscated sensitive data.

Obfuscation management module 17 can identify and obfuscate sensitive data from production database 12 so that the protected data can be used in quality assurance testing database 14. Having data in quality assurance testing database 14 that is similar to the data in production database 12 allows for more accurate quality assurance testing. Because the concatenation includes a unique descriptor and a primary key, the obfuscated sensitive data can be retrieved from production database 12, such that the sensitive data is reversibly obfuscated.

FIG. 3A is a diagram showing table 36 of data that includes sensitive data from production database 12. FIG. 3B is a diagram showing table 38 of data that includes the sensitive data that has been obfuscated and non-sensitive data that has not been obfuscated from quality assurance testing database 14. Table 36 includes fields F (F1, F2, F3, F4, F5, F6, F7, and F8). Table 38 includes result fields FR (FR1, FR2, FR3, FR4, FR5, FR6, FR7, and FR8).

Table 36 is a table of data in production database 12. Table 36 includes raw data, including both sensitive data and non-sensitive data. As seen in FIG. 3A, table 36 has title ACCOUNT 12345, which contains data related to employee tenure. Fields F1, F2, F3, and F4 make up a first row of table 36. Fields F1, F2, F3, and F4 contain data relating to a first person. Fields F5, F6, F7, and F8 make up a second row of table 36. Fields F5, F6, F7, and F8 contain data relating to a second person. Fields F1 and F5 make up a first column of table 36, and contain data related to first names, which is sensitive data. Fields F2 and F6 make up a second column of table 36, and contain data related to last names, which is sensitive data. Fields F3 and F7 make up a third column of table 36, and contain data related to dates of birth, which is sensitive data. Fields F4 and F8 make up a fourth column of table 36, and contain data related to number of years worked at the company, which is designated as non-sensitive data. Table 36 is an example of a table of data in production database 12. In other examples, fields F1, F2, F3, F4, F5, F6, F7, and F8 may contain any suitable data.

Field F1 contains the name JOHN. Field F2 contains the name DOE. Field F3 contains the date of birth Feb. 3, 1965. Field F4 contains the employee tenure 7 YEARS. Field F5 contains the name JANE. Field F6 contains the name DOE. Field F3 contains the date of birth Jun. 7, 1989. Field F7 contains employee tenure 10 YEARS.

Table 38 is a result table of data in quality assurance testing database 14. Table 38 contains data copied from table 36 of production database 12. As such, table 38 contains modified data, including sensitive data that has been obfuscated and non-sensitive data that has not been obfuscated. While table 38 is shown as a single table, table 38 may comprise multiple tables. Each field FR represents the resulting data from each field F of table 36 being copied from production database 12 and stored in table 38 in quality assurance testing database 14. The sensitive data in each field F of table 36 in production database 12 is replaced by the obfuscated sensitive data in each field FR of table 38 in quality assurance testing database 14. The obfuscated sensitive data in each field FR in table 38 contains the concatenation of a unique descriptor and a primary key. The sensitive data in underlying field F is replaced with the concatenation of a unique descriptor and a primary key. The unique descriptor in each field FR is unique to all other fields in quality assurance testing database 14. The unique descriptor in field FR describes the underlying sensitive data from field F. The unique descriptor is a generic term that identifies the type of sensitive data that is obfuscated in field FR from underlying field F but does not identify the actual underlying sensitive data in field F. The primary key identifies the table in production database 12 from which the obfuscated sensitive data originates. Each field within the same table has the same primary key. Each table of data has a different primary key.

Result fields FR1. FR2, FR3, and FR4 make up a first row of table 38. Fields FR1, FR2, FR3 and FR4 contain data relating to the first person. Result fields F5, F6, F7, and F8 make up a second row of table 38. Result fields FR5, FR6, FR7, and FR8 contain data relating to the second person. Result fields FR1 and FR5 make up a first column of table 38, and contain the obfuscated sensitive data related to first names. Result fields FR2 and FR6 make up a second column of table 38, and contain the obfuscated sensitive data related to last names. Result fields FR3 and FR7 make up a third column of table 38, and contain the obfuscated sensitive data related to dates of birth. Result fields FR4 and FR8 make up a fourth column of table 38, and contain the non-sensitive data that has not been obfuscated and is related to number of years worked at the company.

Field FR1 contains obfuscated sensitive data from underlying field F1 of table 36. Field FR1 contains a concatenation of unique descriptor NAME1 and primary key 12345, resulting in NAME1_12345. Field FR2 contains obfuscated sensitive data from underlying field F2 of table 36. Field FR2 contains a concatenation of unique descriptor NAME2 and primary key 12345, resulting in NAME2_12345. Field FR3 contains obfuscated sensitive data from underlying field F3 of table 36. Field FR3 contains a concatenation of unique descriptor DOB1 and primary key 12345, resulting in DOB1_12345. Field FR4 contains non-sensitive data from underlying field F4 of table 36. Field FR4 contains the employee tenure 7 YEARS. Field FR5 contains obfuscated sensitive data from underlying field F5 of table 36. Field FR5 contains a concatenation of unique descriptor NAME3 and primary key 12345, resulting in NAME3_12345. Field FR6 contains obfuscated sensitive data from underlying field F6 of table 36. Field FR6 contains a concatenation of unique descriptor NAME4 and primary key 12345, resulting in NAME4_12345. Field FR7 contains obfuscated sensitive data from underlying field F7 of table 36. Field FR7 contains a concatenation of unique descriptor DOB2 and primary key 12345, resulting in DOB2_12345. Field FR8 contains non-sensitive data from underlying field F8 of table 36. Field FR8 contains the employee tenure 10 YEARS.

Table 36 is associated with a single primary key, which is not associated with any other table in production database 12. As such, primary key 12345 indicates that data in table 38 in quality assurance testing database 14 is derived from table 36 in production database 12 as the data in each field FR contains the primary key 12345. Each field FR is associated with a unique descriptor that describes the underlying field of the sensitive data. For example, obfuscation management module 17 replaces the actual name JOHN in field F1 with NAME1. Because NAME1 has now been used, obfuscation management module 17 replaces the subsequent name DOE in field F2 with NAME2. The unique descriptors NAME1, NAME2, NAME3, and NAME4 indicate that the resulting fields FR1, FR2, FR5, and FR6 of obfuscated data are names but do not disclose the actual names (JOHN, DOE, JANE, DOE). Because the unique descriptors NAME1, NAME2, NAME3, and NAME4 are each unique, each unique descriptor can tie each field of obfuscated data back to the correct underlying field from table 36 from production database 12. As such, the unique descriptors indicate the fields F (F1, F2, F5, and F6) from production database 12 from which each field FR (FR1, FR2, FR5, and FR6) of the obfuscated sensitive data originates. The unique descriptors DOB1 and DOB2 indicate that the resulting fields FR3 and FR7 of obfuscated data are dates of birth but do not disclose the actual dates of birth (Feb. 3, 1965 and Jun. 7, 1989). Because the unique descriptors DOB1 and DOB2 are each unique, each unique descriptor can tie each field of obfuscated data back to the correct underlying field from table 36 from production database 12. As such, the unique descriptors indicate the fields F (F3 and F7) from production database 12 from which each field FR (FR3 and FR4) of obfuscated sensitive data originates. Because fields F4 and F8 contain non-sensitive data, fields FR4 and FR5 contain the actual data, the actual number of years worked.

Because each table in production database 12 has a different primary key, the primary key allows for backtracking from a field of obfuscated sensitive data in quality assurance testing database 14 to the original table in production database 12 that contains the non-obfuscated sensitive data, the actual data. Because each table in production database 12 has multiple fields in it, the unique descriptor allows for backtracking from the field of obfuscated sensitive data to the specific field within the original table in production database 12, identified by the primary key, that contains the non-obfuscated sensitive data. As such, the concatenation of the unique descriptor and the primary key allows the obfuscated sensitive data to be tied back to the original table and field in production database 12 that contains the actual data, the sensitive data that has not been obfuscated.

The unique descriptor allows the user of quality assurance testing database 14 to know the type of data that is being retrieved without disclosing the actual sensitive data. As such, the unique descriptor shields the users of quality assurance testing database 14 from the sensitive data while allowing the users of quality assurance testing database 14 to accurately run quality assurance testing. For example, a user of quality assurance testing database 14 may need to know whether reports are pulling the correct information. Because the unique descriptor describes the underlying sensitive data, the user of quality assurance testing database 14 has access to the type of sensitive data that is obfuscated, allowing the user to determine whether the testing is yielding the proper results. For example, a user of quality assurance testing database 14 can run a query that is intended to result in names of employees at the company. The user will be able to see whether the data is name data without the actual names being disclosed. If the query is successful and the user can see that name data (e.g. NAME1_12345, NAME2_12345, NAME3_12345, NAME4_12345) is the resulting data, the user can determine that the query passes quality assurance testing. If the query is unsuccessful and the user can see that date of birth data (DOB1_12345, DOB2_12345) is the resulting data, the user can determine that the query does not pass quality assurance testing.

Additionally, because the unique descriptors are unique, the user can know whether the data from various queries is the same data or different data. For example, the concatenation NAME1_12345 is different data from NAME3_12345 because the unique descriptor NAME1 is different from the unique descriptor NAME3. If the descriptor was not unique (e.g. NAME and NAME), the user of quality assurance testing database 14 would not know whether the data was the same name data or different name data. Thus, the concatenation of a unique descriptor and a primary key that replaces the sensitive data within a field during obfuscation adequately protects sensitive data while improving quality assurance testing within quality assurance testing database 14.

Figure 4:
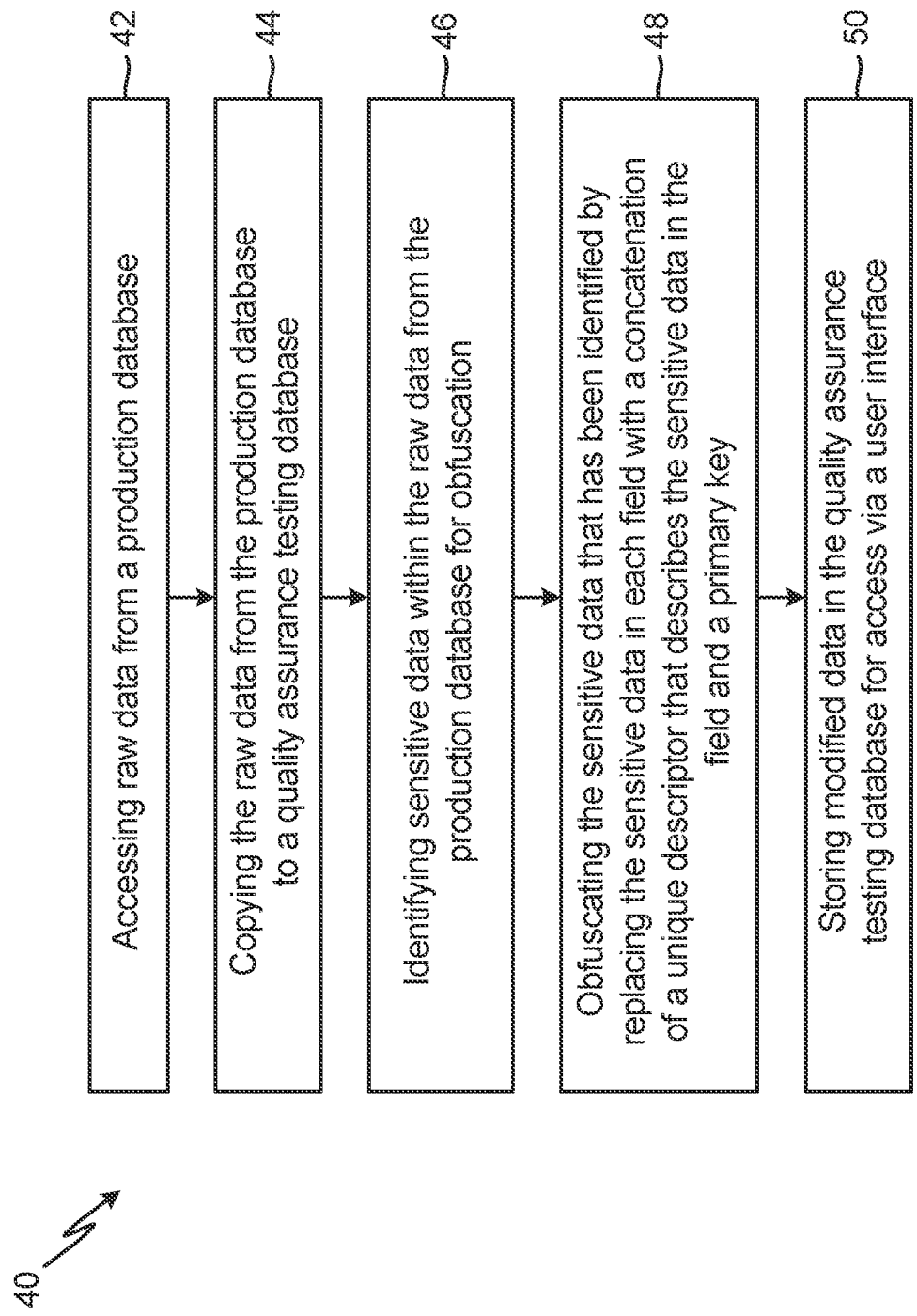
FIG. 4 is a flowchart illustrating steps of a process for obfuscating the sensitive data using the system of FIG. 1.

FIG. 4 is a flowchart illustrating steps 42-50 of process 40 for obfuscating the sensitive data using obfuscation system 10. Process 40 includes step 42, step 44, step 46, step 48, and step 50.

Step 42 is a first step of process 40. At step 42, obfuscation management server 16 accesses raw data from production database 12. Data transfer module 28 of obfuscation management module 17 accesses raw data from production system 12. Raw data is data within production system 12. The raw data includes sensitive data and non-sensitive data.

Step 44 is a second step of process 40. At step 44, obfuscation management server 16 copies the raw data from production database 12 to quality assurance testing database 14. Data transfer module 28 of obfuscation management module 17 copies the raw data that has been accessed in production database 12 to quality assurance testing database 14.

Step 46 is a third step of process 40. At step 46, obfuscation management server 16 identifies sensitive data within the raw data from production database 12 for obfuscation. Data obfuscation module 30 of obfuscation management module 17 identifies sensitive data in the raw data that has been copied from production database 12 via obfuscation list 18. The remainder of the raw data from production database 12 that has not been identified as sensitive is the non-sensitive data.

Step 48 is a fourth step of process 40. At step 48, obfuscation management server 16 obfuscates the sensitive data that has been identified by replacing the sensitive data in each field with a concatenation of a unique descriptor that describes the sensitive data in the field and a primary key. Data obfuscation module 30 of obfuscation management module 17 obfuscates the sensitive data that has been identified. The sensitive data in each field in a table of rows and columns is obfuscated by replacing the sensitive data with a concatenation of a unique descriptor that describes the sensitive data in the underlying field and a primary key. As described above with respect to FIGS. 3A, 3B, 4A, and 4B, the unique descriptor is unique to the field from production database 12 from which the sensitive data originates and describes the sensitive data. As described above with respect to FIGS. 3A, 3B, 4A, and 4B, the primary key is unique to the table from production database 12 from which the field of the sensitive data originates.

Step 50 is a fifth step of process 40. At step 50, obfuscation management server 16 stores modified data in quality assurance testing database 14 for access via user interface 20. Obfuscated data storage module 32 of obfuscation management module 17 stores the sensitive data that has been obfuscated in quality assurance testing database 14. Non-obfuscated data storage module 34 of obfuscation management module 17 stores the non-sensitive data that has been copied from production database 12, but has not been obfuscated, in quality assurance testing database 14. Copied data within quality assurance testing database 14 is modified data. Modified data includes the sensitive data that has been obfuscated and the non-sensitive data that has not been obfuscated. The modified data in quality assurance testing database 14 can be accessed through obfuscation management server 16 via user interface 20. For example, when a user of quality assurance testing database 14 runs a test query, the resulting table(s) of data can include sensitive data that has been obfuscated and non-sensitive data that has not been obfuscated.

Obfuscation system 10 using process 40 for data obfuscation allows sensitive data in production database 12 to remain private in quality assurance testing database 14 while still enabling quality assurance testing. For example, users of quality assurance testing database 14 are still informed whether newly developed changes, such as queries, are working correctly. Replacing sensitive data from production database 12 with a concatenation of a unique descriptor and a primary key in quality assurance testing database 14 via process 40 results in more accurate quality assurance testing with optimal data protection.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An obfuscation system comprising:
a first database for storing raw data;
a second database for storing modified data;
one or more processors; and
computer-readable memory encoded with instructions that, when executed by the one or more processors, cause the obfuscation system to:
access raw data from the first database;
copy the raw data from the first database to the second database;
identify sensitive data within the raw data for obfuscation;
obfuscate the sensitive data that has been identified by replacing the sensitive data in each field with a concatenation of a unique descriptor that describes the sensitive data in the field and a primary key, wherein the primary key identifies a table in the first database from which the obfuscated sensitive data originates; and
store the modified data in the second database for access via a user interface, the modified data comprising the sensitive data that has been obfuscated and non-sensitive data of the raw data that has not been obfuscated.

2. The obfuscation system of claim 1, wherein the first database is a production database, and the second database is a quality assurance testing database.

3. The obfuscation system of claim 1, wherein the remainder of the raw data from the first database that has not been identified as sensitive is the non-sensitive data.

4. The obfuscation system of claim 1, wherein the unique descriptor is a generic term.

5. The obfuscation system of claim 4, wherein the unique descriptor is configured to identify the type of the sensitive data in the field but does not identify the sensitive data.

6. The obfuscation system of claim 1, wherein the unique descriptor is unique to all other fields in the second database.

7. The obfuscation system of claim 1, wherein the first database comprises a plurality of tables, and wherein each table of the plurality of tables contains fields of data and has a different primary key, and each field of the fields of data within a same table has a same primary key.

8. The obfuscation system of claim 1, wherein the sensitive data comprises personally identifiable data, and the non-sensitive data comprises data that has not been identified as personally identifiable data.

9. The obfuscation system of claim 1, wherein the sensitive data is reversibly obfuscated.

10. A method of obfuscating data for a quality assurance testing database, the method comprising:
accessing raw data from a production database;
copying the raw data from the production database to a quality assurance testing database;
identifying sensitive data within the raw data from the production database for obfuscation;
obfuscating the sensitive data that has been identified by replacing the sensitive data in each field with a concatenation of a unique descriptor that describes the sensitive data in the field and a primary key, wherein the primary key identifies a table in the production database from which the obfuscated sensitive data originates; and
storing modified data in the quality assurance testing database for access via a user interface, the modified data comprising the sensitive data that has been obfuscated.

11. The method of claim 10, wherein the modified data further comprises non-sensitive data of the raw data that has not been obfuscated.

12. The method of claim 10, wherein the raw data comprises sensitive data and non-sensitive data.

13. The method of claim 12, wherein the non-sensitive data comprises data that has not been identified as personally identifiable data.

14. The method of claim 12, wherein the sensitive data comprises personally identifiable data.

15. The method of claim 10, wherein the production database comprises a plurality of tables, and wherein each table of the plurality of tables contains fields of data and has a different primary key, and each field of the fields of data within a same table has a same primary key.

16. The method of claim 10, wherein the unique descriptor is a generic term configured to identify the type of the sensitive data in the field but does not identify the sensitive data.

17. The method of claim 10, wherein the unique descriptor is unique to all other fields in the quality assurance testing database.

18. The method of claim 10, wherein the sensitive data is reversibly obfuscated.

* * * * *